Jan. 14, 1936. F. T. KREIN 2,027,830
SLAB FILLER
Filed June 14, 1933
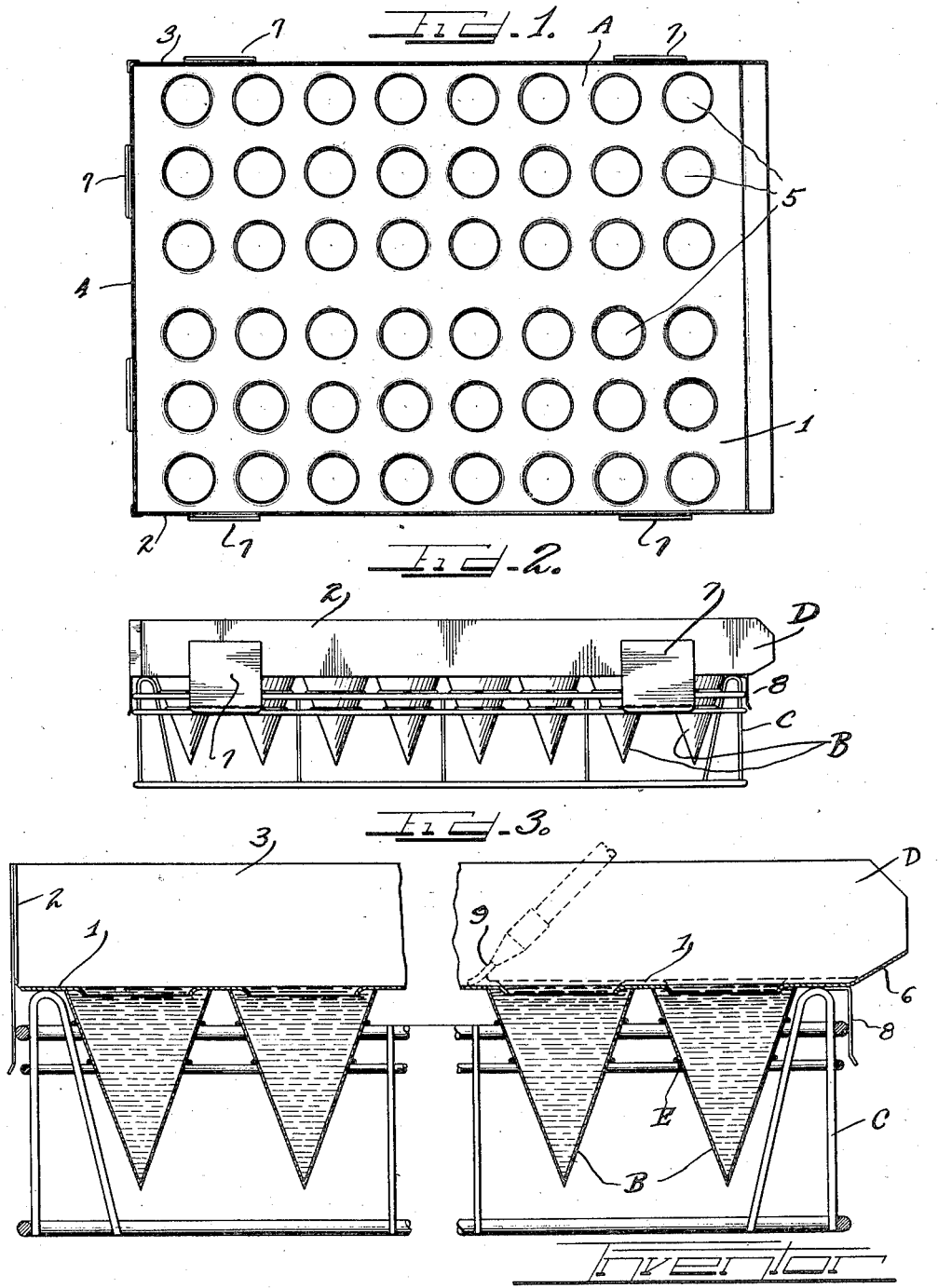
Inventor
Frederick Thomas Krein.

Patented Jan. 14, 1936

2,027,830

UNITED STATES PATENT OFFICE 2,027,830

SLAB FILLER

Frederick Thomas Krein, Park Ridge, Ill., assignor to Vortex Cup Company, Chicago, Ill., a corporation of Delaware Application June 14, 1933, Serial No. 675,678

2 Claims. (Cl. 226—93)

The present invention relates to a slab filler and has to do more particularly with frozen confections, such as ice cream, sherbet and the like, and is concerned more particularly with means for simultaneously filling by hand a plurality of cups or similar containers in an expeditious and economical manner.

There are, on the market at the present time, machines for filling containers with food products of semi-frozen or mushy state for quantity production.

The present invention relates to a slab filler for hand filling of a plurality of cups or containers with ice cream or like material, in semi-frozen or mushy state, where the ice cream manufacturer does not have an automatic machine for filling such containers.

An object of the present invention is to provide novel means for quickly filling a plurality of containers with food products in semi-frozen or mushy state, which are later to be frozen or hardened for eating in such condition.

Another object of the invention is to provide a novel hopper for application to a plurality of cups or containers for rapid and economical filling purposes.

Generally speaking, the invention contemplates a hopper having a perforated bottom which is removably applied to a container supporting means, and which is provided with means for positioning the hopper on the container supporting means in such manner that the perforations in the hopper will register with the containers to be filled.

The above, other and further objects of the invention will be apparent from the following description, accompanying drawing, and appended claims.

An embodiment of the invention is illustrated in the accompanying drawing and the views thereof are as follows:

Figure 1 is a top plan view of one form of hopper embodying principles of the present invention.

Figure 2 is a side elevational view of the hopper of Figure 1 shown as applied to a wire filling and freezing tray supporting a plurality of containers, therein illustrated as conical cups, in position to be filled.

Figure 3 is a fragmental enlarged longitudinal sectional view through the arrangement of Figure 2.

The drawing will now be explained.

The containers are sometimes herein referred to as "cups", but it is to be understood that this reference is not by way of limitation, as any suitable container for the purpose may be utilized and the shapes of the individual containers may be varied as occasion demands.

While the cups may be made of any suitable material, metallic or otherwise, stiff or flexible, porous or non-porous, preferably the cups are made of such material as parchment or thin paper, which is flexible yet sufficiently stiff to retain proper shape, and preferably coated with wax or like material so as to be moistureproof and discourage excessive absorption of the contents.

At the present time, the ice cream manufacturer delivers the ice cream products, such as sherbet, ice cream, frozen juices and the like, to the retailer who places such products in his refrigerator and dispenses them one by one, to the consumer when the occasion arises.

In small manufacturing plants, where the cost of automatic filling machines would be prohibitive, hand-filling is practiced. The present invention lends itself very readily to such hand-filling practice as it enables the simultaneous filling of a plurality of containers without waste of the filling material.

The accompanying drawing shows a hopper arranged for filling 48 containers simultaneously. Of course, the hopper could be larger or smaller as occasion requires without departing from the present invention.

In the drawing, the hopper, designated generally at A, is shown as rectangular in plan and includes a flat bottom 1, two side marginal flanges 2 and 3, and one end flange 4. Flanges 2, 3, and 4 are preferably formed of the same piece of material of which the hopper A is made. The bottom 1 is provided with a plurality of perforations 5 arranged to correspond to the position and arrangement of the containers B supported in the filling and freezing tray, designated generally at C.

It will be observed that the flanges 2, 3, and 4 extend substantially the greater portion of the length of the periphery of the hopper A with the ends separated forming a gap D. A portion of the bottom 1 is, in the gap D, bent up slightly to provide a lip 6, which is disposed at an oblique or obtuse angle with respect to the bottom 1 of the hopper A. This lip 6 serves as a dam to prevent escape of the semi-frozen or mushy material which is flowed onto the hopper for filling the various containers B. The flanges 2, 3, and 4 extend farther above the bottom 1 of the hopper than the upper extremity of the lip 6.

The cup supporting means or tray C is illustrated as formed of wire and provides a plurality of spaces E for receiving the various containers or cups B in position to be filled. The tray C may be placed on a shelf, table or platform for filling purposes.

When it is desired to fill the cups B, the tray C is placed on a suitable support, and the spaces E filled with the containers or cups B. When all of the spaces E have been supplied with cups, the hopper A is then applied over the tray C by downward vertical movement of the hopper.

The hopper A is provided with depending members 7, illustrated as suitably fastened to the flanges 2, 3, and 4.

When the hopper A is applied over the tray C, the depending members 7 engage against the outside of the tray to properly position the hopper so that the openings 5 therein register with the cups B supported in the tray C. These depending members 7, also serve to prevent relative movement between the hopper A and the tray C, during the filling process.

As an added means, a depending member 8 is secured against the under side of the bottom 1 of the hopper A adjacent the lip 6 to cooperate with the depending members 7 on the marginal flange 4 to prevent forward and backward movements of the hopper in use.

The hopper has been illustrated as rectangular, although, of course, it could be of any shape as desired, being made to correspond with the contour of the tray C.

The openings 5 in the bottom 1 of the hopper A are preferably slightly smaller than the openings in the open ends of the cups or containers to be filled, to prevent spillage of the filling material.

The cups or containers B are filled by flowing the semi-frozen or mushy material onto the bottom 1 of the hopper A whereupon some of this drops through the openings 5, into the underlying cups or containers C. If necessary, a squeegee, indicated in dotted lines at 9, may be employed for forcing the filling material into the cups B. By careful manipulation, just sufficient filling material may be flowed onto the hopper A to fill the contents of all of the cups beneath it so that there is practically no waste by spillage of the filling material. Should there be any excess filling material remaining after all of the cups have been filled, this may be scraped off over the lip 6 into a pan for re-use.

When the cups B have been filled, in the manner stated, the hopper A is then removed by vertical movement and applied over another tray C, which, in the meantime, has been supplied with the proper number of cups B for repetition of the filling process.

It will be observed that by provision of the novel hopper, herein described, it is possible to hand-fill a plurality of cups or containers, simultaneously, expeditiously and economically.

When the cups have been filled, and the hopper A removed, the tray C is then transported to a hardening room where it remains until the contents of the cups or containers become sufficiently hard for shipment to a merchant.

The lip 6 and the flanges 2, 3, and 4 prevent the filling material from escaping from the hopper A except through the openings 5.

The members 7 and 8 engage the tray C with frictional fit.

This invention has been herein described more or less precisely as to details, yet it is to be understood that the invention is not to be limited thereby as changes may be made in the arrangements and proportion of parts, and equivalents may be substituted, without departing from the spirit and scope of the invention.

The invention is claimed as follows:

1. In combination, an open-work tray having a relatively narrow side bar therearound and cup sockets therein, and a filling hopper having a relatively flat bottom with holes punched therein and the circumferential margin around each of said holes turned downwardly, resilient means depending from said hopper for frictional gripping engagement with said side bar and disposed so as to hold said hopper at all sides on said tray with said holes registering with said cup sockets, said hopper having an upstanding flange around a substantial part of its periphery with the balance of its periphery free of the flange, and the bottom of said hopper having an upward inclination at the flange-free portion of the hopper sufficiently to retain an amount of substance in the hopper and permit any excess substance to be swept from the hopper over said inclination.

2. In combination, a tray arranged to support a plurality of containers to be filled, a filling hopper arranged for disposition on said tray, said hopper having a substantially flat bottom with holes punched therein and the circumferential margin around each hole turned downwardly to form a hollow depending portion for insertion in a container on said tray, means associated with said hopper for frictional engagement with said tray preventing relative movement between said hopper and said tray in any but a vertical direction, said hopper having an upstanding flange around a substantial part of its periphery leaving a portion of the periphery free of said flange, and the bottom of said hopper having an upward inclination adjacent the flange-free portion such as to permit the ready sweeping of excess filling material over said inclination.

FREDERICK THOMAS KREIN.